(12) United States Patent
Antur et al.

(10) Patent No.: US 6,243,815 B1
(45) Date of Patent: *Jun. 5, 2001

(54) METHOD AND APPARATUS FOR RECONFIGURING AND MANAGING FIREWALLS AND SECURITY DEVICES

(76) Inventors: Anand K. Antur, 1552 Woodmeadow Ct., San Jose, CA (US) 95131; Sanjay Sawhney, 3445 Homestead Ave., #34, Santa Clara, CA (US) 95051; Hemant Puri, P.O. Box 994, Henderson Ave., #4, Sunnyvale, CA (US) 94086; Naveen S. Bisht, 724 Duncanville Ct., Campbell, CA (US) 95008

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,313

(22) Filed: Dec. 24, 1997

Related U.S. Application Data

(60) Provisional application No. 60/044,853, filed on Apr. 25, 1997.

(51) Int. Cl.[7] .................................................. G60F 11/00
(52) U.S. Cl. ............................................. 713/201; 709/220
(58) Field of Search .................................... 713/201, 200; 709/220, 221, 223

(56) References Cited

U.S. PATENT DOCUMENTS

| | | | |
|---|---|---|---|
| 5,577,209 | * 11/1996 | Boyle et al. ......................... | 713/201 |
| 5,606,668 | * 2/1997 | Shwed ................................. | 713/201 |
| 5,664,170 | * 9/1997 | Taylor ................................. | 709/220 |
| 5,838,907 | * 11/1998 | Hansen ............................... | 709/220 |
| 5,864,666 | * 1/1999 | Shrader ............................... | 713/201 |

OTHER PUBLICATIONS

Fitzgerald, Steven et al., A Directory Service for Configuring High–Performance Distributed Computations, IEEE, 1997, pp. 365–375.*

Silver, Daniel L. et al., X.500 Directory Schema Management, IEEE, 1994, pp. 393–400.*

* cited by examiner

*Primary Examiner*—Robert Beausoleil
*Assistant Examiner*—Bryce P. Bonzo
(74) *Attorney, Agent, or Firm*—Townsend and Townsend and Crew LLP

(57) ABSTRACT

A method for reconfiguring network security devices coupled to a network directory services server, the network directory services server providing network directory services to the network security devices, includes the steps of storing configuration data for a first network security device at a pre-determined directory location, copying the configuration data from the predetermined directory location to a directory used by the first network security device using the network directory services in response to a first reconfigure request, and updating configuration of the first network security device according to the configuration data in the directory used by the first network security device.

24 Claims, 11 Drawing Sheets

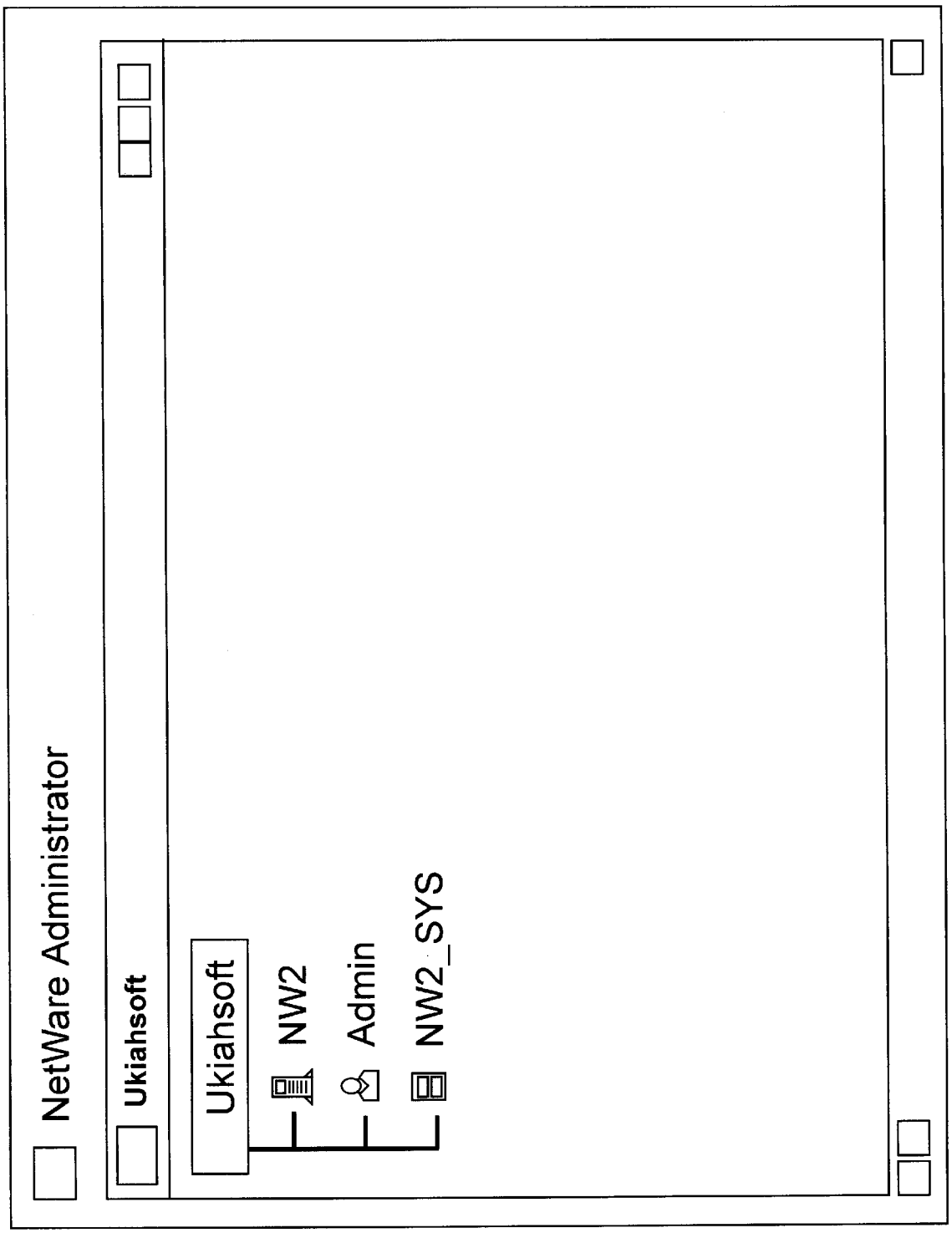

METHOD AND APPARATUS FOR RECONFIGURING AND MANAGING FIREWALLS AND SECURITY DEVICES

This application claims the benefit of U.S. Provisional No. 60/044,853 filed Apr. 25, 1997.

BACKGROUND OF THE INVENTION

The present invention relates to reconfiguring and managing network security devices. More specifically, the present invention relates to reconfiguring of network firewalls and security devices at single administration points. Further, the present invention relates to management of multi-platform firewalls using services such as VPN, Authentication Servers, etc.

Introduction

With the explosive growth of the Internet, computer users are now able to access many valuable sources of information, and, at the same time, users are now exposed to many new perils. Such perils include downloading of destructive computer viruses to sophisticated third-party, network attacks. In response to dangers lurking from "outside" computer networks, firewalls and other types of security devices have emerged as a preferred type of computer network security system.

As corporations and other organizations connect their networks to the public Internet, the risks of endangering information assets have risen dramatically. Not a day or a week passes without the popular press commenting on the latest episode of Internet-related fraud, information corruption, or other incidents that dramatically underscore the darker side of the communications revolution. Computer and communications security, a topic once the exclusive province of obscure firms catering mainly to the government defense, intelligence agencies, and to financial services companies, have become mainstream almost overnight.

The concern for network security has led to a need for more sophisticated security systems than most organizations have needed until now. At one time, these organizations were content with the security provided by their network operating systems, network directory services, routers, and gateways. However, these rudimentary systems are now no longer sufficient to resist the attacks of legions of determined Internet hackers, or from an organization's own employees.

Generally, a firewall is a security mechanism for controlling access between a private, trusted network and an untrusted outside network (which might be the public Internet or some other part of the corporate network within the intranet). Firewalls typically provide from one to three levels of security: packet filtering, circuit-level gateways, and application-level gateways. Firewalls are not all created alike for they often differ greatly in their architecture, the types platforms they run upon, their security capabilities, and their ability to support mixed protocol networks. For example, the mixed protocol network: TCP/IP is not, contrary to popular belief, the only network protocol still left standing—millions of IPX clients still need to get secure access to the Internet without going through the dreaded "forklift upgrade" to a whole new protocol stack.

Mixed Protocol Networks

Rumors of the death of NetWare as a network platform are exaggerated. Although WindowsNT is gaining market share, there are in excess of three million NetWare servers (and 55 million NetWare clients) currently in use. Thus, mixed networks at both the protocol and operating system platform level will be around for years to come as well as the need to securely and seamlessly access the Internet and its rich information resources.

Current solutions for providing security in mixed protocol networks are quite limited in scope. For example, IP/IPX gateways provide Internet connectivity for IPX clients, but the security is very basic. Application security, for example, is generally based only on TCP ports numbers alone, although some products also support ICMP or UDP port-based filtering. Further, the security focus of these gateway products is typically on controlling outbound access, and not on dealing with the more serious problem of inbound network access. More importantly, these gateways do not appear to provide security for IP clients.

Other mixed protocol network solutions such as filtering bridges or packet-level filtering by routers are partial solutions, and have major security limitations. Further, they typically do not support Internet services for IPX clients. IP firewalls (as long as they provide capabilities up to and including an application level gateway), provide some security for IP clients, but not for IPX clients and servers. Dual-protocol-stack clients can be implemented to get around the IP-only nature of the Internet and of IP firewalls, but this method is complex to implement and manage and is very difficult to administer.

The usefulness of firewalls has been limited, by their inability to work in hybrid network environments that employ multiple protocols and multiple platforms. What is needed are improved firewall configuration and management methods and apparatus for such hybrid network environments.

SUMMARY OF THE INVENTION

The present invention discloses methods and apparatus for configuring and managing firewalls.

According to one embodiment, a method for reconfiguring network security devices coupled to a network directory services server, the network directory services server providing network directory services to the network security devices, includes the steps of storing configuration data for a first network security device at a pre-determined directory location, and copying the configuration data from the pre-determined directory location to a directory used by the first network security device using the network directory services in response to a first reconfigure request. The step of updating configuration of the first network security device according to the configuration data in the directory used by the first network security device is also disclosed.

According to another embodiment, a method for configuring network security devices includes the steps of providing a network directory server providing network directory services to a plurality of network security devices, classifying each network security device into hierarchical classes of network security devices including a first network security class, a second network security class, and a third network security class, the third network security class including network security devices classified within the first network security class and within the second network security class, and storing configuration data for the first network security class at a first directory location, configuration data for the second network security class at a second directory location, and configuration data for the third network security class at a third directory location. The step of copying the configuration data from the first directory location to a first plurality of directories, each of the first plurality of directories used by network security devices classified within the first network security class, in response to a first update request is also disclosed. Updating configuration of the first network security devices according to the configuration data in the respective directories is also performed.

Further understanding of the nature and advantages of the invention may be realized by reference to the remaining portions of the specification, drawings, and attached documents

BRIEF DESCRIPTION OF THE DRAWINGS

FIGS. 6a–c illustrate installation of firewall configuration information according to an embodiment of the present invention; and

DESCRIPTION OF SPECIFIC EMBODIMENTS

Firewall Primer

Figure 1:
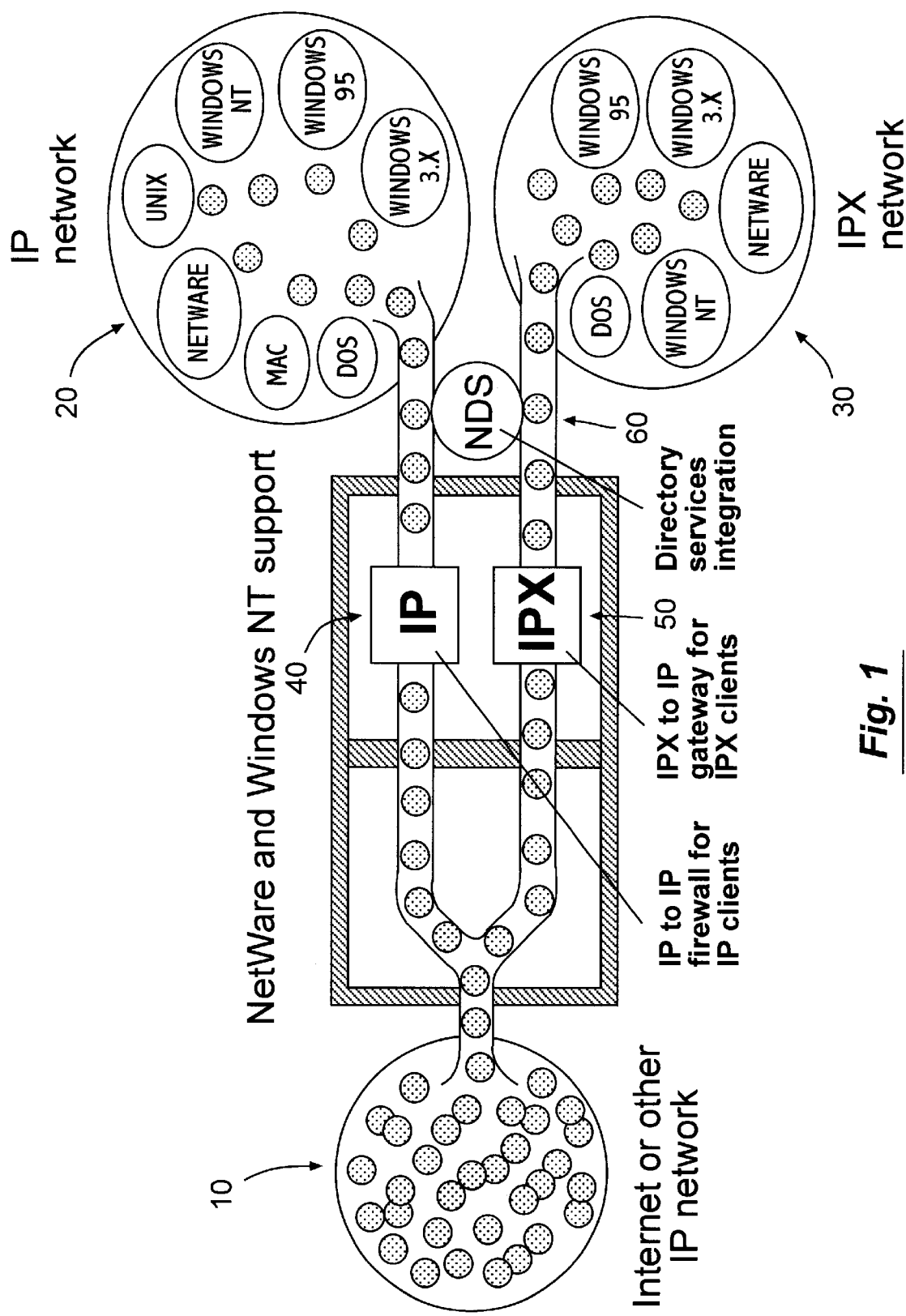
FIG. 1 illustrates a typical embodiment of the present invention.

This following section defines some essential security terms and explains some key concepts essential to understanding the different architectural approaches to building firewalls.

Definitions

Firewall: A type of security mechanism for controlling access between a private trusted network and an untrusted outside network (which might be the public Internet or some other part of the corporate network within an intranet). It typically includes software running on general purpose or specialized hardware.

Protocol gateway: A protocol translation mechanism for connecting (for example) an IPX network to an IP network, for example a public network to private network. The term 'gateway' is also sometimes used to refer to circuit-level and application-level firewalls but these are not protocol gateways.

LDAP: Lightweight Directory Access Protocol, a proposed directory protocol standard.

DS: Directory Services are global, distributed information databases that provide access to network resources, regardless of physical location. Such directory services are preferably Novell Directory Services, MicroSoft's Active Directory Services, LDAP and other directory services provide central points of administration for entire networks of networks. DS typically maintain information about every resource on the network, including users, groups, printers, volumes, and other devices. This information is typically stored on a single logical database, thus, instead of logging onto many individual file servers, users and network administrators log onto the network preferably only once.

Network address translation (NAT): With the growing shortage of IP addresses, it has become increasingly difficult for organizations to obtain all the registered IP addresses they need. A network address translator solves this problem by dynamically converting between a re-usable pool of dynamically assigned registered IP addresses and the internal IP addresses used in an organization's intranet. This not only alleviates the IP address crunch, but it also eliminates the need to renumber when an organization changes Internet service providers (ISPs).

Transparent proxy: A transparent proxy provides the user with the ability to use an application process running on a firewall without explicitly requiring the client to specify that proxy. In other words, the client perceives that it is still speaking to the router gateway. This feature typically makes it considerably easier to install a firewall without having to reconfigure every client in a TCP/IP environment.

The major types of networks in terms of their security classification are as follows:

Trusted network: Users on this network are, by default, deemed to be trustworthy. Users may be physically on a common network, or linked together via a virtual private network (VPN).

DMZ: The 'Demilitarized Zone' lies outside the perimeter defenses provided by the firewall but contains systems that are owned by a private organization. Common examples would be Web servers and anonymous ftp servers providing information to Internet users.

Untrusted network: These are outside networks of various kinds, among the many thousands of networks connected to the Internet, or even untrusted networks that may be part of other departments or divisions within an organization.

Types of Firewalls

Firewalls typically provide one of three different levels of security—packet filtering, circuit-level gateway, and application gateway—or some combination of these.

Packet filtering firewalls typically provide the most basic form of firewall security and is typically a standard feature of routers. Packet filters inspect the header of each incoming and outgoing packet for user-defined content, such as an IP address or a specific bit pattern, but do not validate or track the state of sessions. These firewalls typically also filter at the application port level—for example, ftp access generally utilizes port 21. However, since any packet with the right IP address can pass through the filter once the port is enabled, there is a security hole for other applications or sessions addressed to the same port. Packet filtering is typically the least secure form of firewall and typically the cheapest.

Circuit-level gateway firewalls validate TCP and, in some products, User Datagram Protocol (UDP) sessions before opening a connection or circuit through the firewall. The state of the session is monitored, and traffic is only allowed while the session is still open. This is more secure than packet filtering but allows any kind of data through the firewall while the session is open, creating a security hole. This is better than packet filtering but still falls short of total security. Further, if this gateway does not support UDP, it cannot support native UDP traffic such as domain name service (DNS) and SNMP.

Application-level gateway firewalls run an application process (sometimes termed a 'proxy') on the firewall for each application that is supported. By understanding the application and the content of the traffic flowing through the firewall, typically a high degree of control can be applied. For example, a given user can have the right to use a certain application, such as ftp, but only for some commands (such as "get") and not for others (such as "put"). In addition, application traffic, down to the level of specific file types, can be controlled, for example by allowing ".doc" files to be transferred through the gateway, but not ".xls" files, which might contain company financial data. These firewalls typically also provide highly detailed logging of traffic and security events. In addition, application-level gateway firewalls can use NAT to mask the real IP address on a node on the internal network and thus make it invisible to the outside.

Stateful inspection firewalls are essentially hybrid firewalls that have elements of all of the above firewalls, but lack the full application layer inspection capabilities of an application level gateway. An example of such a firewall is a traffic inspection engine is based on a generalized scripting language. The engine executes inspection rules written in this language. The principal advantage over an application gateway is that it can provide greater simplicity in terms of adding firewall support for new applications, however it typically lacks security robustness.

Typically, the most secure form of firewall, as illustrated by the preferred embodiment of the present invention, is a 'multi-level firewall'—one which combines the capabilities of a packet filter, a circuit level gateway and an application level gateway to provide in-depth defense. Security attacks can come at any level. For example, some kinds of attacks are best prevented at the application level (such as an illegal file write operation to a corporate server using FTP) while others are best prevented at the packet level (such as IP spoofing)—the combination of multiple levels of security is stronger than any one of them used alone.

To provide enhanced security and support for multi-protocol networks, for example, with IP and IPX clients, the present application describes a new category of firewall—one that integrates both a multi-level IP firewall and an IPX/IP gateway.

Security Policy

Firewalls and other types of security devices provide means of enforcing security policies that define acceptable uses of applications and acceptable access to information—both inbound and outbound. Since all network communications between a trusted network and all other types of network must pass through the firewall in a well-designed network, the firewall is uniquely well positioned to play the role of network traffic "cop".

The user organization's access policy on the inbound side might define acceptable access to specific servers or other host by time of day, by type of application, or by type of file, and the like. On the outbound side, the policy might also prevent users from accessing specific Web sites, specific pages within a Web site, and the like. A source of a communication, a destination, and a specific application are typically included in a security policy. Inbound or outbound communications that fall outside of the parameters of the policy are considered security violations, and a multi-level firewall can and should be configured to detect and prevent them.

However sophisticated the hardware and software that provides a network's security perimeter, network security is typically only as good as the organization's security policy and the users who implement it—including end users and network administrators alike. Since users are the weak link in any security system, ease of use and ease of management are essential to providing a security system that will not be abandoned because it is too hard to use or too expensive to manage.

Further information regarding firewalls can be found in the following references: Repelling the Wily Hacker, Bill Cheswick and Steve Bellovin, Addison-Wesley, 1994; Building Internet Firewalls, D. Brent Chapman and Elizabeth Zwicky, O'Reilly & Associates, 1995; Web Server Technology, Nancy Yeager and Robert McGrath, Morgan Kaufman Publishers, 1996, hereinby incorporated by reference for all purposes.

System Overview

FIG. 1 illustrates a typical embodiment of the present invention. FIG. 1 includes a plurality of untrusted networks 10 (such as an IP network), a trusted IP based network 20, a trusted IPX based network 30, an IP to IP based firewall server 40, an IP to IPX based firewall server 50, and a directory services (DS) server 60.

As illustrated in FIG. 1, access from trusted network such as trusted IP network 20 or trusted IPX network 30 to untrusted networks 10 are preferably enabled by firewall server 40 or 50. As shown, when access is required from trusted IP network 20, an IP client to IP server based firewall server 40 is typically required. Further, when access is required from trusted IPX network 20, an IPX client to IP server based firewall server 50 is required.

In the preferred embodiment, directory services (DS) server 60 is provided to enable trusted IP network 20 to communicate with trusted IPX network 30, and vice versa. Preferably, such communication includes accessing of directory structures, files, and the like.

Figure 2:
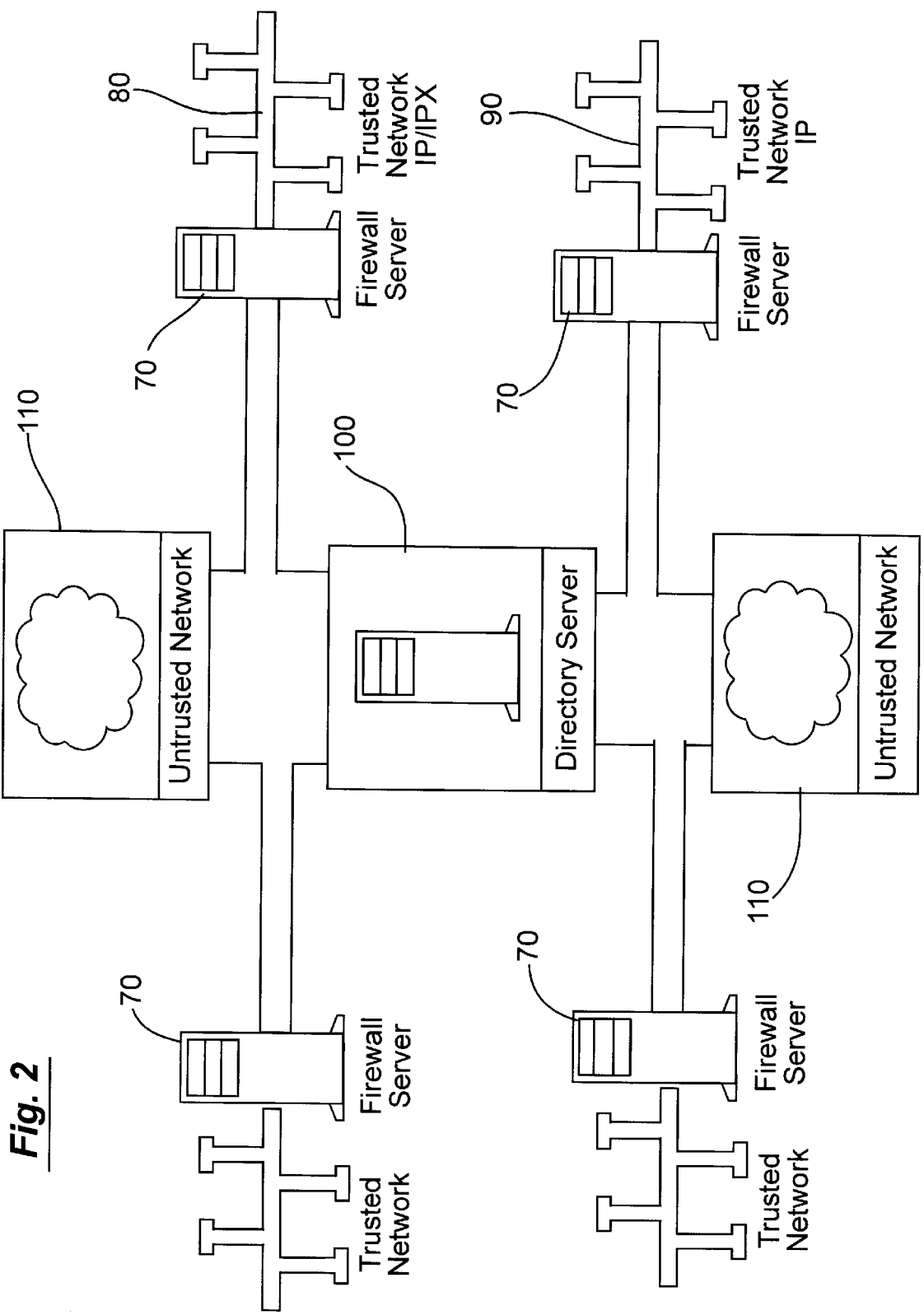
FIG. 2 illustrates a more detailed embodiment of the present invention.

FIG. 2 illustrates a more detailed embodiment of the present invention. FIG. 2 includes a number of firewall servers 70, each preferably coupled to at least one respective trusted network. The trusted networks include IPX based networks 80, and IP based networks 90. A directory services (DS) server 100, and a plurality of untrusted networks 110 are also illustrated.

As shown in FIG. 2, the trusted networks, including IPX based network 80 and IP based network 90 preferably communicate with untrusted networks 110 and each other through respective firewall servers 70. Typical firewall servers are based upon servers having operating systems such as WindowsNT from Microsoft Corporation, NetWare or Intranet Ware from Novell Corporation, proprietary hardware boxes, and the like. Other types of platforms, such as UNIX, and others are used in alternative embodiments of the present invention.

The embodiment illustrated in FIG. 2 represents a network of trusted networks representative of a typical configuration. As shown in detail in FIG. 2, DS server 100 is preferably coupled to the trusted networks by, among other possible configurations, DS server 100. DS server 100 typically embodies directory access services such as Novell Directory Services, LDAP, X.500, ADS, and others. Further information regarding Novell Directory Services (NDS) can be found in documents at the following web site www.novell.com/products/nds/wpnds.html. The documents are incorporated by reference for all purposes.

DS server 100 enables the management of firewall servers 70 from a central administration point. Thus, from the central administration point the user can configure or reconfigure each firewall server to have separate security characteristics, or configure or reconfigure groups of firewall servers to have the same security characteristics. Further the user can use DS server 100 to provide back-up or redundant configuration information, which may be used if the configuration information stored within a local firewall server 70 is compromised or requires updating.

By providing a single point of administration for multiple firewalls, a coherent and uniform security policy can be implemented. Further, by providing this capability, changes in the security policy can be made in a timely fashion. As opposed to logging into each firewall server and modifying the security policy individually, the user logs into one machine, typically DS Server 100 to modify the security policies.

Figure 3:
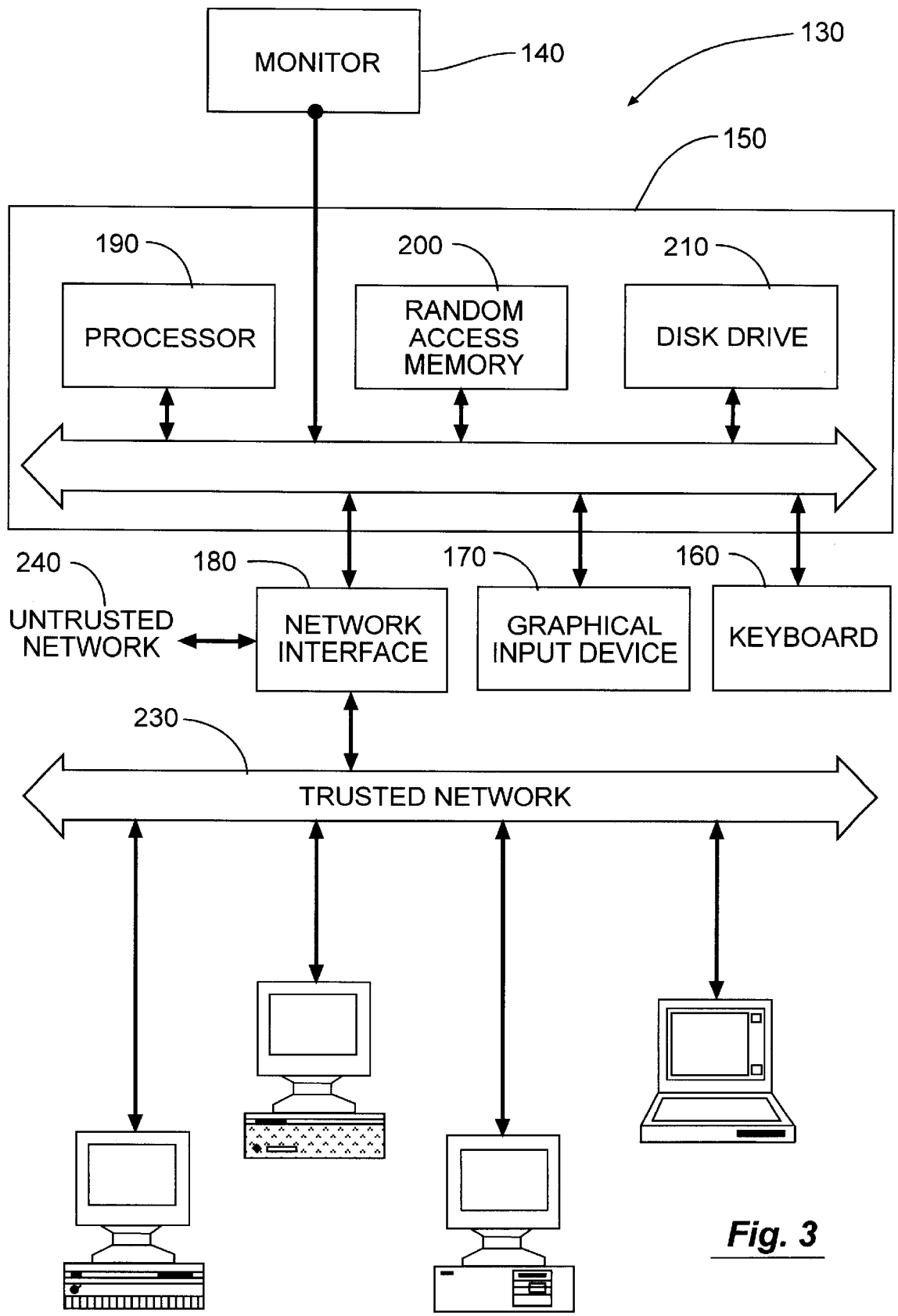
FIG. 3 is a block diagram of a system 130 for firewall servers according to an embodiment of the present invention.

FIG. 3 is a block diagram of a system 130 for firewall servers according to an embodiment of the present invention. System 130 typically includes a monitor 140, a computer 150, a keyboard 160, a graphical input device 170, for example, a mouse, and a network interface unit 180. Computer 150 includes familiar computer components such as a processor 190, and memory storage devices, such as a random access memory (RAM) 200, a disk drive 210, and a system bus 220 interconnecting the above components. Coupled to system 130 are a trusted network 230 and an untrusted network 240.

RAM 200 and disk drive 210 are examples of tangible media for storage of messages, computer programs, configuration files, including embodiments of the present invention, etc. Other types of tangible media include floppy disks, removable hard disks, optical storage media such as CD-ROMS and bar codes, semiconductor memories such as flash memories, read-only-memories (ROMS), ASICs, and battery-backed volatile memories, and the like. Network interface units 180 may be any conventional interface means such as a modem; a network card from 3Com Corporation, Bay Networks, and the like; a hardware or a software router, such as Novell's Net Ware MultiProtocol Router, and the like.

In the preferred embodiment, there are at least two network interface units 180, one "externally" coupled to untrusted network 240 and one coupled to trusted network 230. The addition of additional network interface units may be used to couple system 130 to other trusted networks.

In an embodiment, System 130 includes a 586 microprocessor-class based computer, running on Novel NetWare 4.X Operating system or WindowsNT 4.0 for workstations network software and FireWALL software available from Ukiah Software, Inc. FireWall software is typically user configurable by the use of configuration software that implements a user's firewall security policy.

It should be understood that coupling of system 130 to trusted network 230 need not be a direct connection. It is envisioned that trusted network 230 may be coupled to system 130 by a virtual private network, or similar system, via an untrusted network, such as the Internet.

FIG. 3 is representative of but one type of system for embodying the present invention. It will be readily apparent to one of ordinary skill in the art that many system types and configurations are suitable for use in conjunction with the preferred embodiment of the present invention.

Figure 4A:
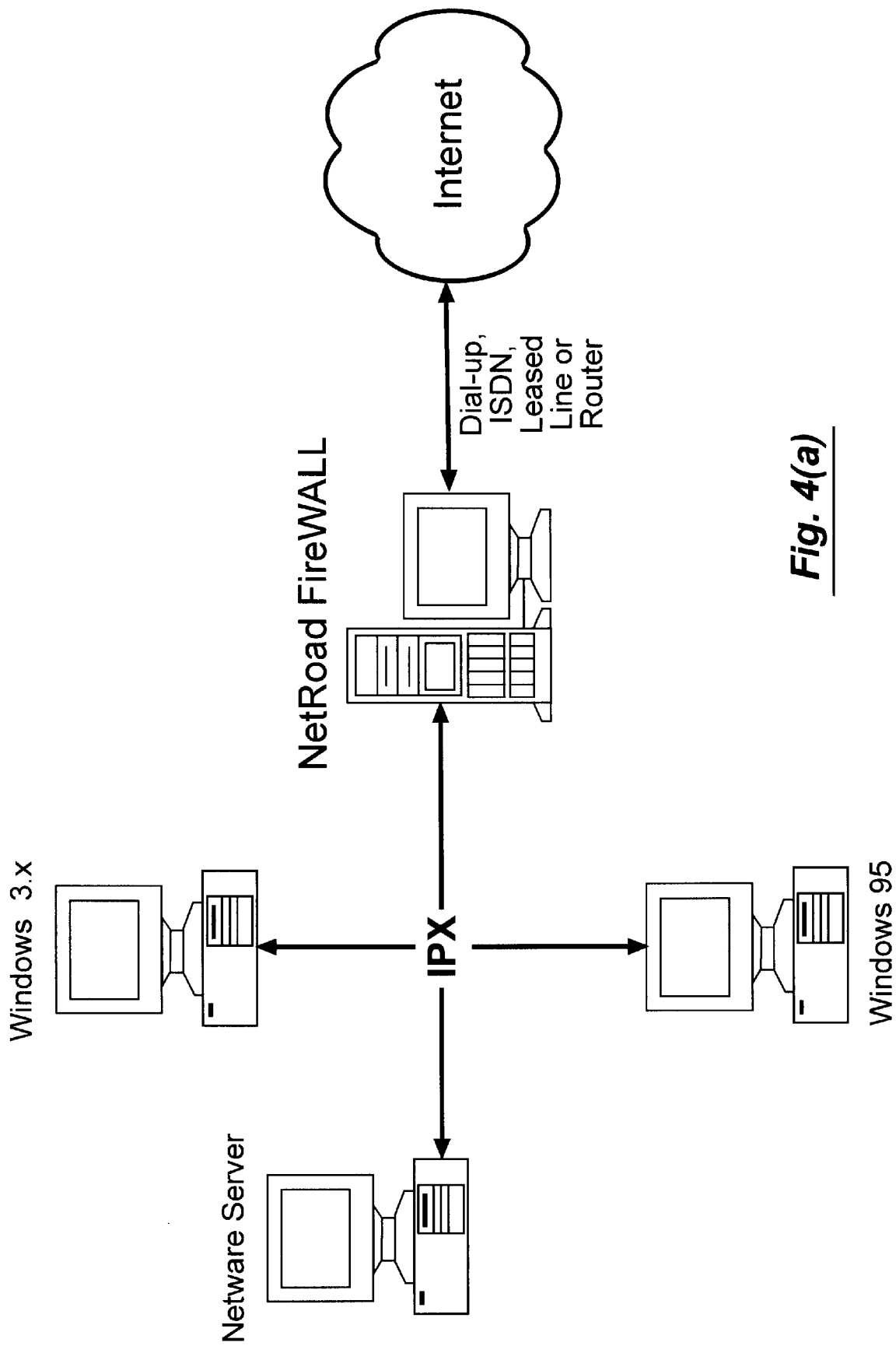
FIGS. 4a–c illustrate typical firewall system configurations for embodiments of the present invention.
Figure 4B:
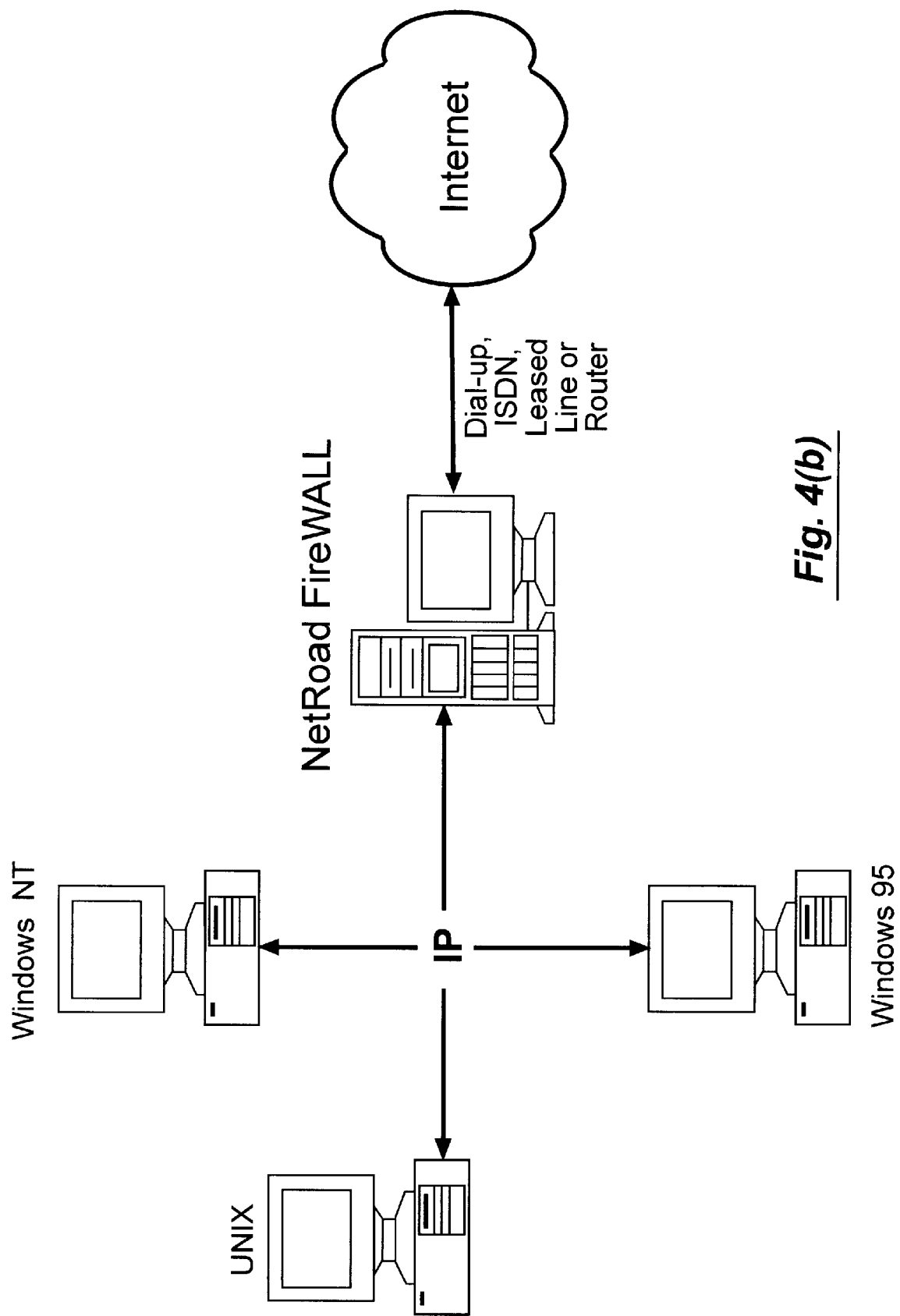
Figure 4C:
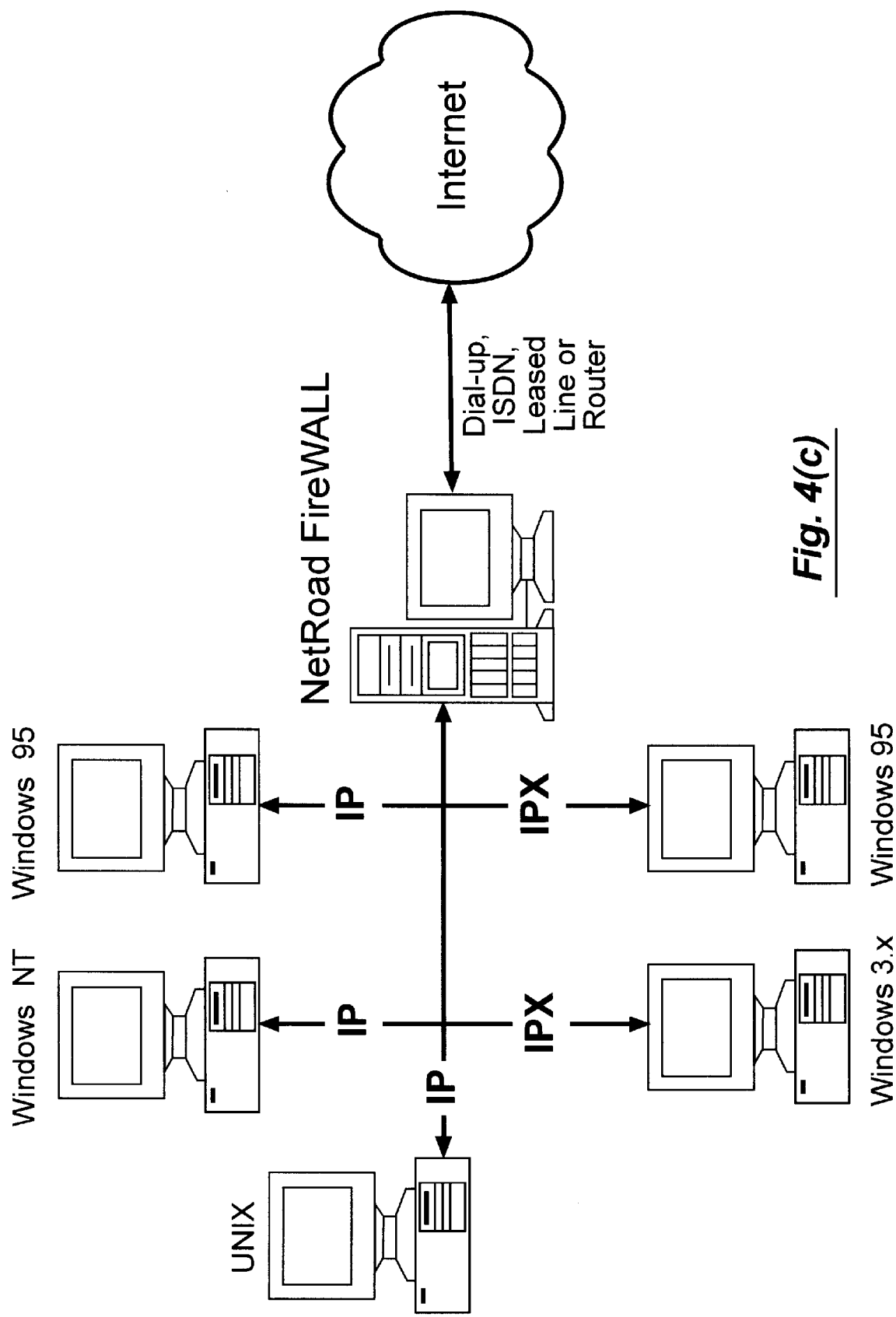

FIGS. 4a–c illustrate typical firewall system configurations for embodiments of the present invention. FIG. 4a illustrates the system configured for a pure IPX network; FIG. 4b illustrates the system configured for a pure IP network; and FIG. 4c illustrates the system configured for a mixed IP/IPX network. FIG. 4a includes a network server 260 and a firewall server 270; FIG. 4b includes a firewall server 290; and FIG. 4c includes a firewall server 310.

In the embodiment in FIG. 4a, network server 260 operates in a pure IPX network and is typically based upon Novell NetWare Server software, In this configuration, firewall server 270 independently provides the firewall and security services and also preferably provides IPX/IP gateway services to the Internet.

In one embodiment of the present invention, firewall server 270 and network server 260 are implemented on physically distinct computer systems. Alternatively, firewall server 270 and network server 260 are implemented upon the same physical computer system, and Netware Server provides the IPX/IP gateway services.

In the embodiment in FIG. 4b, a network server for a pure IP network may be based upon UNIX, WindowsNT or Windows95 servers. In this configuration, firewall server 290 provides the firewall and other security services, but without the IPX/IP gateway services.

In the embodiment in FIG. 4c, a mixed protocol network may be based upon both IPX and IP protocols, as illustrated. In this configuration, firewall server 310 provides the firewall and other security services, and preferably provides the IPX/IP gateway services for IPX transmission packets as needed.

Figure 5:
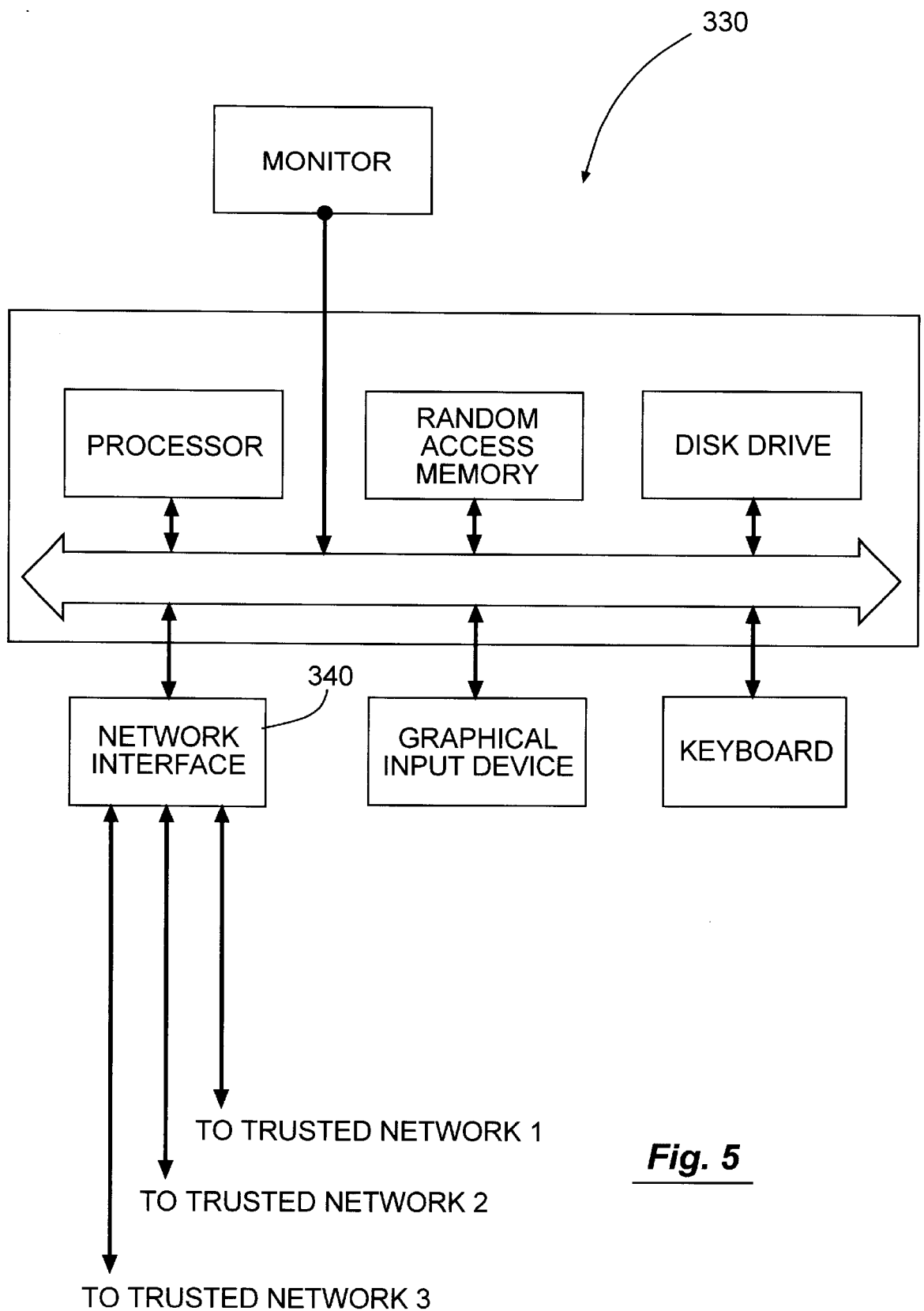
FIG. 5 is a block diagram of a system 330 for a directory services server according to an embodiment of the present invention.

FIG. 5 is a block diagram of a system 330 for a directory services server according to an embodiment of the present invention. System 330 preferably includes many of the same computer hardware and software components described above for FIG. 3.

In FIG. 5, it is preferred that the network interface unit 340 is coupled to internal networks to provide Directory Services between those internal networks. As an example, as illustrated in FIG. 2, DS server 100 is coupled to the trusted networks through firewall servers 70 and can provide directory access from trusted network 80 to trusted network 90 that is transparent to the user.

To provided cross network directory services, it is preferred that each internal network conform with the same directory services protocol. Several of these protocols were mentioned above (Novell Directory Services, LDAP, and the like.) System 330 thus preferably manages directory services requests between internal networks according to the chosen directory services protocol. Further, in one particular embodiment, System 330 preferably manages requests to modify configuration files within firewalls of internal networks.

FIG. 5 is representative of but one type of system for embodying the present invention. It will be readily apparent to one of ordinary skill in the art that many system types and configurations are suitable for use in conjunction with the preferred embodiment of the present invention.

It should be understood that coupling of system 330 to the trusted networks need not be a direct connection. As illustrated in the embodiment in FIG. 2, the coupling is performed via firewall servers 70. Further, it is envisioned that trusted networks may be coupled to system 330 by virtual private networks, or similar system, via a trusted or an untrusted network such as the Internet, or any combination of the above connections, and the like.

In the embodiment illustrated in FIG. 2, DS server 100 provides a central database (a directory services database) that stores configuration information of internal networks such as IPX based networks 80 and IP based networks 90, including in the present embodiment, firewall server 70 configuration information.

Figure 6B:
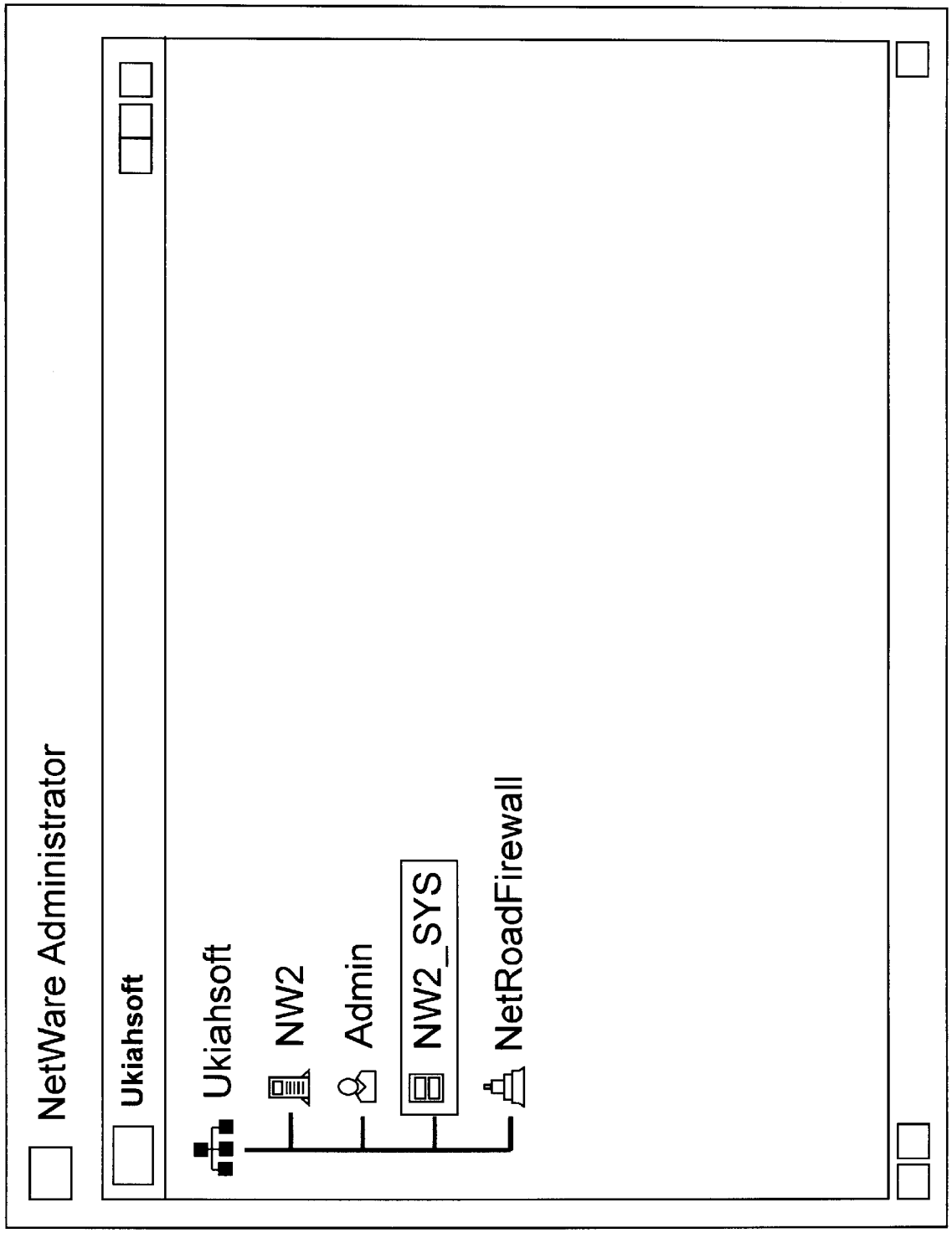
Figure 6C:
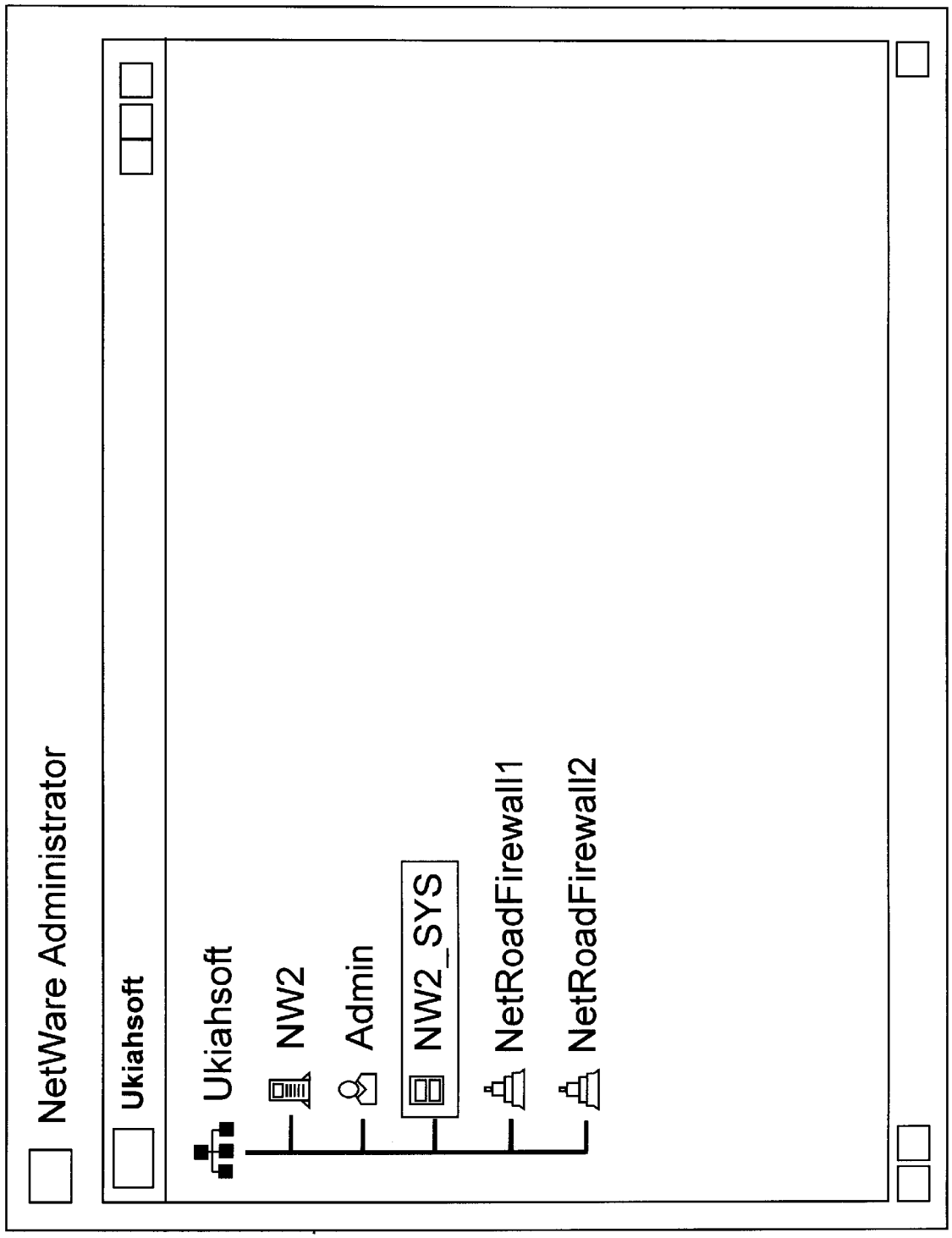

FIGS. 6a–c illustrate installation of firewall configuration information according to an embodiment of the present invention. In particular, FIGS. 6a–c illustrate an embodiment implemented using Novell Directory Services. Other directory services standards or protocols may alternatively be used in other embodiments.

In order to integrate firewall configuration capability to the Novell Directory Services, a configuration administration tool is implemented as a NetWare Administrator software (NWADMIN) "snap-in." The installation of this snap-in extends the Novell Directory Services schema by adding a firewall class and associated attributes. As will be described below, the associated attributes include firewall configuration parameters such as names, groups, access control policies, and the like; and audit log files such as security events, connections, and the like. Password protection and control are thus preferably administered and enforced through the Directory Services administration software.

FIG. 6b illustrates the extension of the Novell Directory Services to include a class of security devices, namely firewall 350. FIG. 6b illustrates the extension of a Directory Services with a single firewall, in a configuration such as illustrated in FIG. 2, and FIG. 6c illustrates the extension of a Directory Services with multiple firewalls 370. Administration of one firewall or multiple firewalls from a single administration point is thus provided with a typical graphical user interface as shown.

Figure 7:
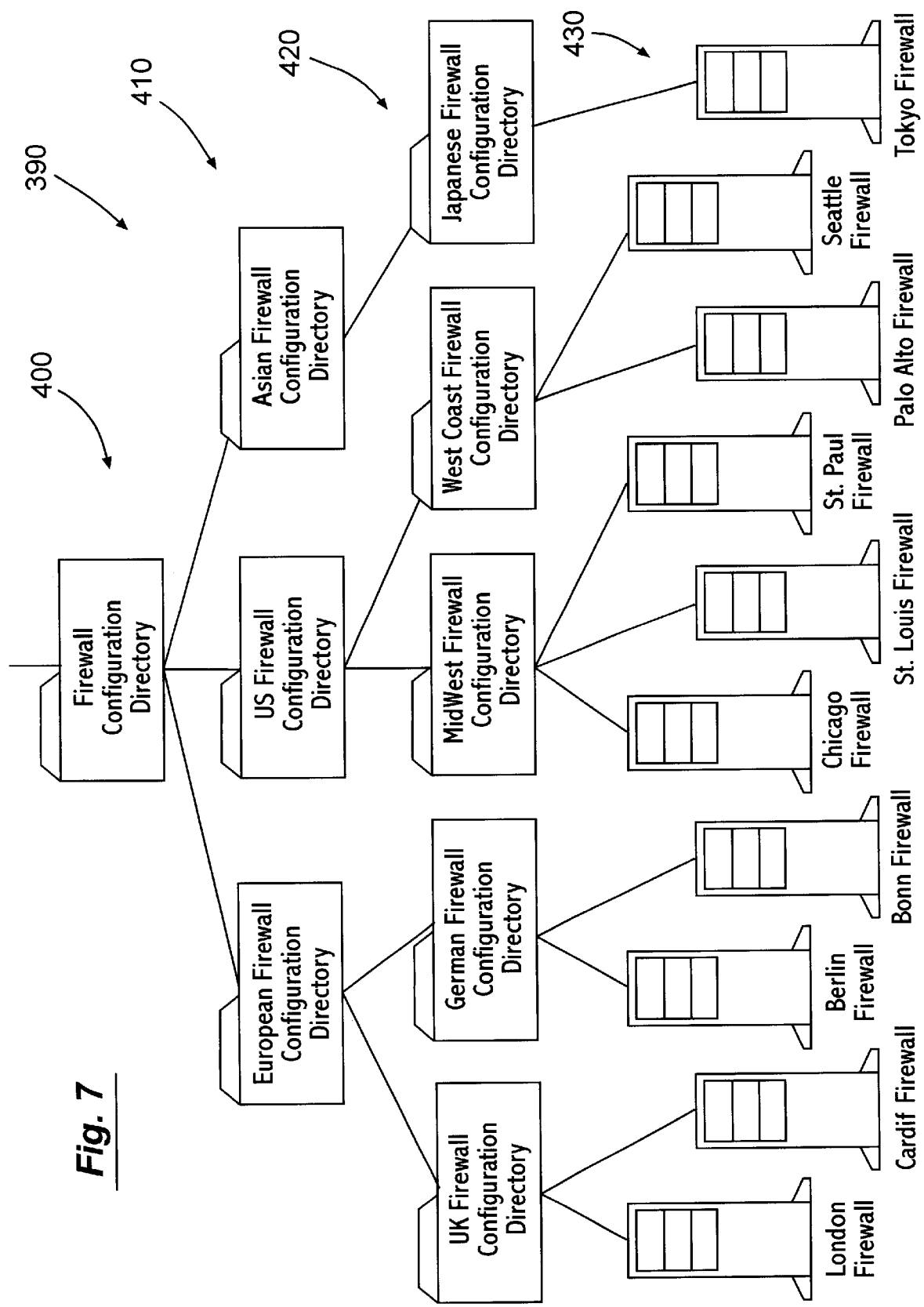

FIG. 7 illustrates a hierarchial directory structure 390 according to an embodiment of the present invention. Hierarchial directory structure 390 includes sub-directories 400, sub-directories 410, and sub-directories 420. Firewalls 430 are coupled to selected sub-directories 420.

The classification of firewalls 430 into different sub-directories as shown, or different classes of firewalls, is preferably performed by the system administrator. Typically, such classification can occur on the basis of geography (as shown); the security requirements, e.g. business confidential, top secret, etc; corporate organization, and the like. Other ways to classify firewalls are contemplated in embodiments of the present invention. This hierarchical classification across different servers having different operating systems (WindowsNT, NetWare, and the like) is facilitated by having each server compatible with a directory services (LDAP, NDS, DA, and the like) as described above.

In one embodiment, firewalls 430 coupled to the same subdirectory-430 are configured according to the configuration data stored within that sub-directory. Thus, for example, the Palo Alto Firewall and the Seattle Firewall are typically configured according to the same configuration parameters. Some typical configuration parameters are found in application Ser. No. 08/998,100 entitled Method and Apparatus for Configuring and Managing Firewalls and Security Devices, filed Dec. 24, 1999, which is incorporated by reference for all purposes.

A greater level of granularization for the hierarchical sub-directory structure than shown is envisioned in embodiments of the present invention. In such embodiments, for example, a Palo Alto sub-directory and a Seattle sub-directory may exist each including configuration data specific for each respective firewall server. Such specific sub-directories are typically resident upon the respective firewall server, and are accessed via the directory services.

The general hierarchical structure of the sub-directories provides the system administrator with ability to change configuration data for classes of firewalls without having to change configuration data for each firewall. For example, in order to change configuration data of U.S. firewalls to prevent access to a particular web site, the system administrator simply modifies configuration data stored in the U.S. configuration directory. In response, the configuration data is automatically copied to the appropriate sub-directories 420. Next, U.S. based firewalls can either be notified to access the appropriate sub-directories 420 to update their configuration data, or the U.S. based firewalls can access the appropriate directories 420 at predetermined time intervals to update their configuration data. Later if a further modification of configuration data is required for only Midwest firewalls, the configuration data of the appropriate sub-directory 420 is accessed and modified.

In one embodiment, each firewall server 430 maintains its own configuration data privately, and accesses configuration data stored in sub-directories 420 only periodically.

In order to facilitate proper configuration of firewall servers within a system, firewall servers may periodically request an updated copy of configuration data from sub-directories 420 at pre-determined intervals. For example, the system administrator may have the firewall server refresh its configuration data every night, or several times a day. Such an embodiment facilitates proper and up-to-date configuration of the firewalls.

In some embodiments, when configuration data from sub-directories 420 are updated, each firewall server may be instructed to update its configuration data to reflect such updates. For example, if there is a new virus threat or a malicious "spammer" discovered, it is important to ensure each firewall configuration be updated in a timely manner in order to lessen the effects of such security threats.

In other embodiments, when the service of a firewall server is disrupted, for example loosing power, loosing communication channels, servicing maintenance, and the like, when the firewall server is brought back up, configuration data is refreshed from sub-directories 420. In such embodiments, the firewall servers either send a request for update to its configuration files, or alternatively accesses the appropriate sub-directory 420 for the configuration file.

In still other embodiments of the present invention, sub-directories 420 are used to store back-up information of configuration information for respectively coupled firewall servers 430. Such an embodiment can be used in a bottom-up system administration approach. In such a case, local firewall servers are configured and administered by local system administrators, and back-up data are stored in sub-directories 420. The back-up data would then be used when any of the above situations occurs, such as when the firewall looses power.

Conclusion

In the foregoing specification, the invention has been described with reference to specific exemplary embodiments thereof. Many changes or modifications are readily envisioned. For example, it is envisioned that different directory services protocols or standards can be used such as LDAP, X500, AD (Active Directory), and the like in alternative embodiments of the present invention. Further, it is envisioned that firewall servers and other security devices may be implemented on different operating system platforms than WindowsNT, NetWare, IntranetWare, UNIX platforms, and the like such as MacOS or even proprietary hardware based firewall solutions. Still further, it is envisioned that in the future, other network protocols other than IP and IPX clients may be used in other embodiments.

The specification has been extensively described with regards to firewalls, however it should be understood that firewalls are merely a common term for a class or type of network access or security devices. Thus embodiments of the present invention can be used with other network security devices, Further, a firewall may have capabilities extending outside the reach of traditional firewalls, for example incorporating quality of service monitoring and metering capability. Still further, the present invention may be applied to security devices that include firewall capabilities although not specifically called firewalls. Such network access or security devices may also provide incoming network access control, outbound network access control, network quality of service control, and other imaginable network control.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for reconfiguring network security devices coupled to a network directory services server from a single administration point, the network directory services server providing network directory services to the network security devices, the method comprising:

providing a hierarchical directory structure having interconnected sub-directories, the hierarchical directory structure coupled to the network security devices and the network directory services server;

storing configuration data for the network security devices at a pre-determined directory location, the network security devices capable of providing security for at least both IP and IPX protocol environments;

copying the configuration data from the predetermined directory location to a first sub-directory using the network directory services provided by the network directory services server in response to a first reconfigure request;

copying the configuration data from the first sub-directory to any lower level sub-directory directly coupled or indirectly coupled to the first sub-directory in the hierarchical directory structure;

installing the configuration data on any network security device coupled to the first sub-directory and any lower level sub-directory directly coupled or indirectly coupled to the first sub-directory; and updating configuration of the network security devices according to the configuration data.

2. The method of claim 1 further comprising receiving the first reconfigure request from a first network security device, wherein the first network security device is one of the any network security device coupled to the first sub-directory and any lower level sub-directory directly coupled or indirectly coupled to the first sub-directory.

3. The method of claim 1 further comprising generating the first reconfigure request when operation of a first network security device is disrupted, wherein the first network security device is one of the any network security device coupled to the first sub-directory and any lower level sub-directory directly coupled or indirectly coupled to the first sub-directory.

4. The method of claim 1 further comprising:

storing configuration data for a first subset of the network security devices at the pre-determined directory location, the first subset delineated by a configuration administration tool in association with the network directory services;

copying the configuration data for the first subset of the network security devices from the predetermined directory location to a sub-directory directly coupled or indirectly coupled to said first subset of the network security devices using the network directory services in response to a second reconfigure request;

installing the configuration data on the first subset of the network security devices; and updating configuration of the first subset of the network security devices according to the configuration data.

5. The method of claim 4 further comprising receiving the second reconfigure request from the first subset of the network security devices.

6. The method of claim 4 further comprising the step of generating the second reconfigure request when operation of the first subset of the network security devices is disrupted.

7. The method of claim 1 wherein the network directory services is selected from a class comprising Novell Directory Services, Light weight Directory Access Protocol, and Microsoft Active Directory Services.

8. The method of claim 1 further comprising providing a first network security device, wherein the first network security device provides functionality of a firewall.

9. A method for configuring network security devices comprising:

providing a network directory server providing network directory services to a plurality of network security devices which are capable of providing security for a plurality of network environments;

classifying each network security device into one or more hierarchical classes of network security devices, said hierarchical classes including a network security class, a first network security sub-class, and a second network security sub-class, said first and said second network security sub-classes being sub-classes of said network security class;

storing configuration data for said first and said second network security sub-classes at a first directory location coupled to the network directory server, said first directory location including one or more directories;

copying the configuration data from the first directory location to a first sub-directory using the network directory services provided by the network directory server, in response to a first update request;

copying the configuration data to each sub-directory coupled to said first sub-directory, wherein the first sub-directory and each sub-directory coupled to said first sub-directory are used by network security devices classified within the first network security sub-class; and updating configuration of network security devices classified within the first network security sub-class according to the configuration data in the respective sub-directories.

10. The method of claim 9 further comprising generating the first update request when operation of one of the network security devices classified within the first network security sub-class is disrupted.

11. The method of claim 9 further comprising:

updating the configuration data for the second network security sub-class to form updated configuration data for the second network security sub-class;

storing the configuration data for the second network security sub-class at the first directory location;

copying the configuration data from the first directory location to a second sub-directory;

copying the configuration data to each sub-directory coupled to said second sub-directory, wherein the second sub-directory and each sub-directory coupled to said second sub-directory are used by network security devices classified within the second network security sub-class; and updating configuration of the network security devices classified within the second network security sub-class according to the configuration data in the respective sub-directories.

12. The method of claim 9 wherein the network directory services is selected from a class comprising Novell Directory Services, Light weight Directory Access Protocol, and Microsoft Active Directory Services.

13. The method of claim 9 wherein the network security devices classified within the first network security sub-class include firewall functionality.

14. A network of network security devices including a computer system for reconfiguring the network security devices and for providing directory services to the network security devices, the computer system including:
- a processor; and
- a computer readable media including:
  - code that directs the processor to provide a hierarchical directory structure having interconnected sub-directories, the hierarchical directory structure coupled to the network security devices;
  - code that directs the processor to store configuration data for the network security devices at a predetermined directory location, the network security devices capable of providing security for at least both IP and IPX protocol environments;
  - code that directs the processor to copy the configuration data from the predetermined directory location to a first sub-directory using the directory services, in response to a reconfigure request;
  - code that directs the processor to copy the configuration data from the first sub-directory to any lower level sub-directory directly coupled or indirectly coupled to the first sub-directory in the hierarchical directory structure;
  - code that directs the processor to install the configuration data on any network security device coupled to the first sub-directory and any lower level sub-directory directly coupled or indirectly coupled to the first sub-directory; and
  - code that directs the first network security device to reconfigure according to the configuration data in the sub-directory used by the first network security device.

15. The network of claim 14 wherein the computer readable media also includes:
- code that directs the processor to store configuration data for a second network security device at the predetermined directory location;
- code that directs the processor to copy the configuration data for the second network security device from the predetermined directory location to a second sub-directory using the directory services, in response to a reconfigure request;
- code that directs the processor to copy the configuration data from the second sub-directory to any lower level sub-directory directly coupled or indirectly coupled to the second sub-directory in the hierarchical directory structure;
- code that directs the processor to install the configuration data on the second network security device coupled to the second sub-directory; and
- code that directs the second network security device to reconfigure according to the configuration data for the second network security device in the second sub-directory used by the second network security device.

16. The network of claim 15 wherein the network security devices are based upon a Novell IntranetWare operating system, and the second network security device is based upon an operating system selected from the class comprising WindowsNT, Novell NetWare, Novell IntranetWare, and UNIX.

17. The network of claim 14 wherein the directory services is selected from a class comprising Novell Directory Services, Lightweight Directory Access Protocol, and Microsoft Active Directory Services.

18. The network of claim 14 wherein the network security devices include firewall features.

19. A method for reconfiguring one or more network security devices from a single administration point, the network security devices coupled to a network directory services server, the network directory services server providing network directory services to the network security devices, the method comprising:
- storing configuration data at a predetermined directory location, the directory location coupled to the network directory services server;
- classifying each of the one or more network security devices into a hierarchical directory structure, the directory structure comprising a plurality of subdirectories;
- copying the configuration data from the directory location to a first subdirectory using the network directory services in response to an update request;
- copying the configuration data to each subdirectory directly coupled or indirectly coupled to the first subdirectory in the hierarchical directory structure;
- installing the configuration data on all network security devices coupled to the first subdirectory and each subdirectory directly coupled or indirectly coupled to the first subdirectory.

20. The method of claim 19 wherein the step of storing configuration data at a predetermined directory location further comprises storing configuration data in a database coupled to the network directory services server.

21. The method of claim 19 wherein the installing the configuration data further comprises automatically installing the configuration data at predetermined intervals.

22. The method of claim 19 wherein the installing step further comprises installing the configuration data in response to a command from the single administration point.

23. The method of claim 19 further comprising at least one first level subdirectory and at least one second level subdirectory, wherein each second level subdirectory is coupled to at least one first level subdirectory, and wherein a copying step performed in a first level subdirectory automatically performs the copying step in the first level sub-directory in any second level subdirectory coupled to the first level subdirectory.

24. The method of claim 23 further comprising at least one third level subdirectory coupled to at least one second level subdirectory wherein the copying step in the second level subdirectory is automatically performed in any third level subdirectory coupled to the second level subdirectory.

* * * * *